United States Patent
Bernhard et al.

(10) Patent No.: US 7,917,469 B2
(45) Date of Patent: Mar. 29, 2011

(54) FAST PRIMARY CLUSTER RECOVERY

(75) Inventors: Benjamin K. D. Bernhard, Arlington, MA (US); Robert S. Mason, Jr., Uxbridge, MA (US)

(73) Assignee: Hitachi Data Systems Corporation, Santa Clara, CA (US)

( * ) Notice: Subject to any disclaimer, the term of this patent is extended or adjusted under 35 U.S.C. 154(b) by 610 days.

(21) Appl. No.: 11/936,317

(22) Filed: Nov. 7, 2007

(65) Prior Publication Data
US 2009/0006888 A1    Jan. 1, 2009

Related U.S. Application Data

(60) Provisional application No. 60/857,728, filed on Nov. 8, 2006.

(51) Int. Cl.
*G06F 17/00* (2006.01)

(52) U.S. Cl. ......... 707/610; 707/614; 707/615; 707/616

(58) Field of Classification Search ............ 707/610
See application file for complete search history.

(56) References Cited

U.S. PATENT DOCUMENTS

| | | | |
|---|---|---|---|
| 6,014,669 A * | 1/2000 | Slaughter et al. | 707/610 |
| 7,124,320 B1 | 10/2006 | Wipfel | |
| 2005/0120025 A1 | 6/2005 | Rodriguez et al. | |

* cited by examiner

*Primary Examiner* — Sana Al-Hashemi
(74) *Attorney, Agent, or Firm* — David H. Judson (57) ABSTRACT

A cluster recovery process is implemented across a set of distributed archives, where each individual archive is a storage cluster of preferably symmetric nodes. Each node of a cluster typically executes an instance of an application that provides object-based storage of fixed content data and associated metadata. According to the storage method, an association or "link" between a first cluster and a second cluster is first established to facilitate replication. The first cluster is sometimes referred to as a "primary" whereas the "second" cluster is sometimes referred to as a "replica." Once the link is made, the first cluster's fixed content data and metadata are then replicated from the first cluster to the second cluster, preferably in a continuous manner. Upon a failure of the first cluster, however, a failover operation occurs, and clients of the first cluster are redirected to the second cluster. Upon repair or replacement of the first cluster (a "restore"), the repaired or replaced first cluster resumes authority for servicing the clients of the first cluster. This restore operation preferably occurs in two stages: a "fast recovery" stage that involves preferably "bulk" transfer of the first cluster metadata, following by a "fail back" stage that involves the transfer of the fixed content data. Upon receipt of the metadata from the second cluster, the repaired or replaced first cluster resumes authority for the clients irrespective of whether the fail back stage has completed or even begun.

11 Claims, 9 Drawing Sheets

FAST PRIMARY CLUSTER RECOVERY

This application is based on and claims priority from application Ser. No. 60/857,728, filed Nov. 8, 2007.

BACKGROUND OF THE INVENTION

1. Technical Field

The present invention relates generally to techniques for highly available, reliable, and persistent data storage in a distributed computer network.

2. Description of the Related Art

A need has developed for the archival storage of "fixed content" in a highly available, reliable and persistent manner that replaces or supplements traditional tape and optical storage solutions. The term "fixed content" typically refers to any type of digital information that is expected to be retained without change for reference or other purposes. Examples of such fixed content include, among many others, e-mail, documents, diagnostic images, check images, voice recordings, film and video, and the like. The traditional Redundant Array of Independent Nodes (RAIN) storage approach has emerged as the architecture of choice for creating large online archives for the storage of such fixed content information assets. By allowing nodes to join and exit from a cluster as needed, RAIN architectures insulate a storage cluster from the failure of one or more nodes. By replicating data on multiple nodes, RAIN-type archives can automatically compensate for node failure or removal. Typically, RAIN systems are largely delivered as hardware appliances designed from identical components within a closed system.

BRIEF SUMMARY OF THE INVENTION

A cluster recovery process is implemented across a set of distributed archives, where each individual archive is a storage cluster of preferably symmetric nodes. Each node of a cluster typically executes an instance of an application that provides object-based storage of fixed content data and associated metadata. According to the storage method, an association or "link" between a first cluster and a second cluster is first established to facilitate replication. The first cluster is sometimes referred to as a "primary" whereas the "second" cluster is sometimes referred to as a "replica." Once the link is made, the first cluster's fixed content data and metadata are then replicated from the first cluster to the second cluster, preferably in a continuous manner. Upon a failure of the first cluster, however, a failover operation occurs, and clients of the first cluster are redirected to the second cluster. Upon repair or replacement of the first cluster (a "restore"), the repaired or replaced first cluster resumes authority for servicing the clients of the first cluster. This restore operation preferably occurs in two stages: a "fast recovery" stage that involves preferably "bulk" transfer of the first cluster metadata, following by a "fail back" stage that involves the transfer of the fixed content data. Upon receipt of the metadata from the second cluster, the repaired or replaced first cluster resumes authority for the clients irrespective of whether the fail back stage has completed or even begun.

The foregoing has outlined some of the more pertinent features of the invention. These features should be construed to be merely illustrative. Many other beneficial results can be attained by applying the disclosed invention in a different manner or by modifying the invention as will be described.

DETAILED DESCRIPTION OF THE INVENTION

Figure 1:
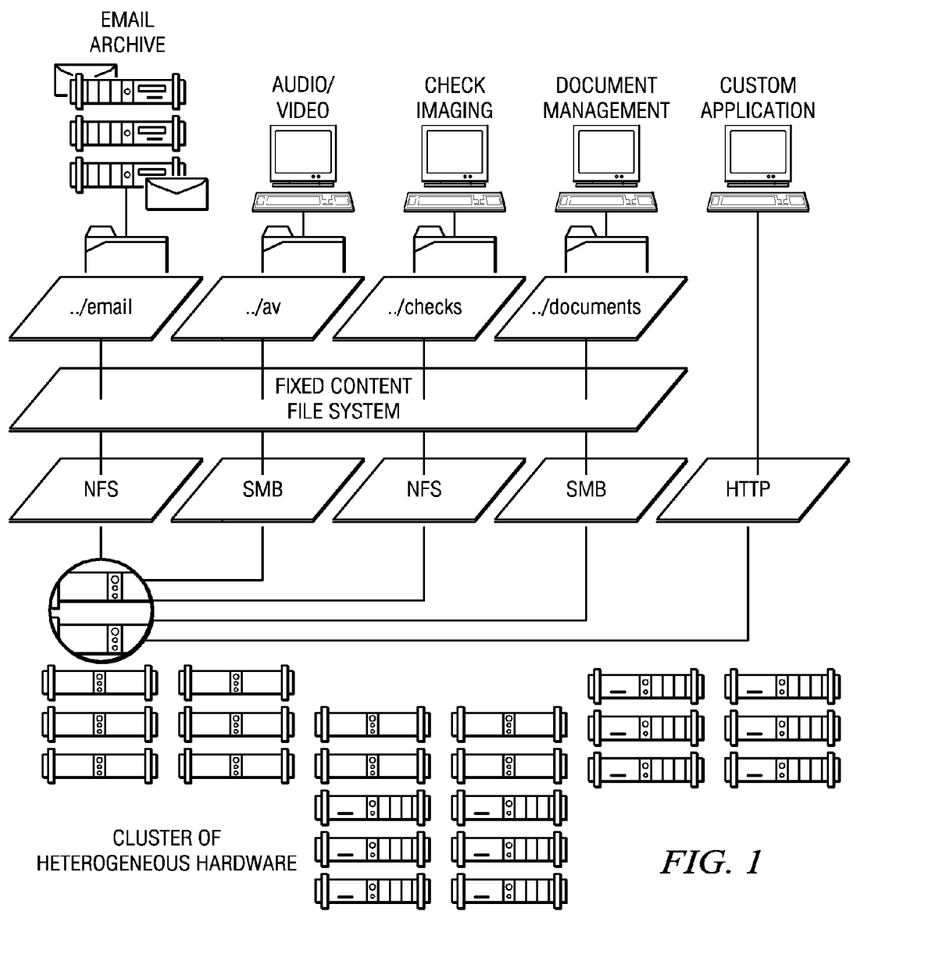
FIG. 1 is a simplified block diagram of a fixed content storage archive in which the present invention may be implemented.

It is also known to provide a scalable disk-based archival storage management system, preferably a system architecture based on a redundant array of independent nodes. The nodes may comprise different hardware and thus may be considered "heterogeneous." A node typically has access to one or more storage disks, which may be actual physical storage disks, or virtual storage disks, as in a storage area network (SAN). The archive cluster application (and, optionally, the underlying operating system on which that application executes) that is supported on each node may be the same or substantially the same. In one illustrative embodiment, the software stack (which may include the operating system) on each node is symmetric, whereas the hardware may be heterogeneous. Using the system, as illustrated in FIG. 1, enterprises can create permanent storage for many different types of fixed content information such as documents, e-mail, satellite images, diagnostic images, check images, voice recordings, video, and the like, among others. These types are merely illustrative, of course. High levels of reliability are achieved by replicating data on independent servers, or so-called storage nodes. Preferably, each node is symmetric with its peers. Thus, because preferably any given node can perform all functions, the failure of any one node has little impact on the archive's availability.

As described in U.S. Pat. No. 7,155,466, a distributed software application executed on each node captures, preserves, manages, and retrieves digital assets. In an illustrated embodiment of FIG. 2, a physical boundary of an individual archive is referred to as a cluster. Typically, a cluster is not a single device, but rather a collection of devices. Devices may be homogeneous or heterogeneous. A typical device is a computer or machine running an operating system such as Linux. Clusters of Linux-based systems hosted on commodity hardware provide an archive that can be scaled from a few storage node servers to many nodes that store thousands of terabytes of data. This architecture ensures that storage capacity can always keep pace with an organization's increasing archive requirements. Preferably, data is replicated across the cluster automatically fails always protected from device failure. If a disk or node fails, the cluster automatically fails over to other nodes in the cluster that maintain replicas of the same data.

Figure 2:
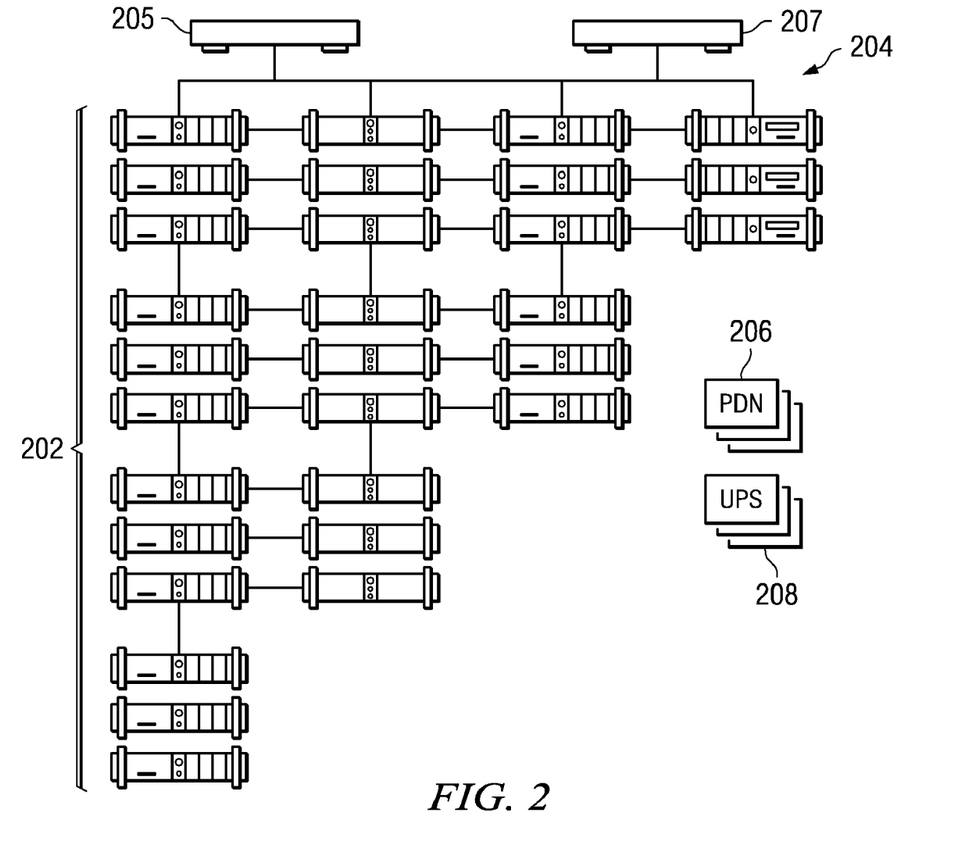
FIG. 2 is a simplified representation of a redundant array of independent nodes each of which is symmetric and supports an archive cluster application according to the present invention.

An illustrative cluster preferably comprises the following general categories of components: nodes 202, a pair of network switches 204, power distribution units (PDUs) 206, and uninterruptible power supplies (UPSs) 208. A node 202 typically comprises one or more commodity servers and contains a CPU (e.g., Intel x86, suitable random access memory (RAM), one or more hard drives (e.g., standard IDE/SATA, SCSI, or the like), and two or more network interface (NIC) cards. A typical node is a 2U rack mounted unit with a 2.4 GHz chip, 512 MB RAM, and six (6) 200 GB hard drives. This is not a limitation, however. The network switches 204 typically comprise an internal switch 205 that enables peer-to-peer communication between nodes, and an external switch 207 that allows extra-cluster access to each node. Each switch requires enough ports to handle all potential nodes in a cluster. Ethernet or GigE switches may be used for this purpose. PDUs 206 are used to power all nodes and switches, and the UPSs 208 are used that protect all nodes and switches. Although not meant to be limiting, typically a cluster is connectable to a network, such as the public Internet, an enterprise intranet, or other wide area or local area network. In an illustrative embodiment, the cluster is implemented within an enterprise environment. It may be reached, for example, by navigating through a site's corporate domain name system (DNS) name server. Thus, for example, the cluster's domain may be a new sub-domain of an existing domain. In a representative implementation, the sub-domain is delegated in the corporate DNS server to the name servers in the cluster itself. End users access the cluster using any conventional interface or access tool. Thus, for example, access to the cluster may be carried out over any IP-based protocol (HTTP, FTP, NFS, AFS, SMB, a Web service, or the like), via an API, or through any other known or later-developed access method, service, program or tool.

Client applications access the cluster through one or more types of external gateways such as standard UNIX file protocols, or HTTP APIs. The archive preferably is exposed through a virtual file system that can optionally sit under any standard UNIX file protocol-oriented facility. These include: NFS, FTP, SMB/CIFS, or the like.

In one embodiment, the archive cluster application runs on a redundant array of independent nodes (H-RAIN) that are networked together (e.g., via Ethernet) as a cluster. The hardware of given nodes may be heterogeneous. For reliability, however, preferably each node runs an instance 300 of the distributed application (which may be the same instance, or substantially the same instance), which is comprised of several runtime components as now illustrated in FIG. 3. Thus, while hardware may be heterogeneous, the software stack on the nodes (at least as it relates to the present invention) is the same. These software components comprise a gateway protocol layer 302, an access layer 304, a file transaction and administration layer 306, and a core components layer 308. The "layer" designation is provided for explanatory purposes, as one of ordinary skill will appreciate that the functions may be characterized in other meaningful ways. One or more of the layers (or the components therein) may be integrated or otherwise. Some components may be shared across layers.

Figure 3:
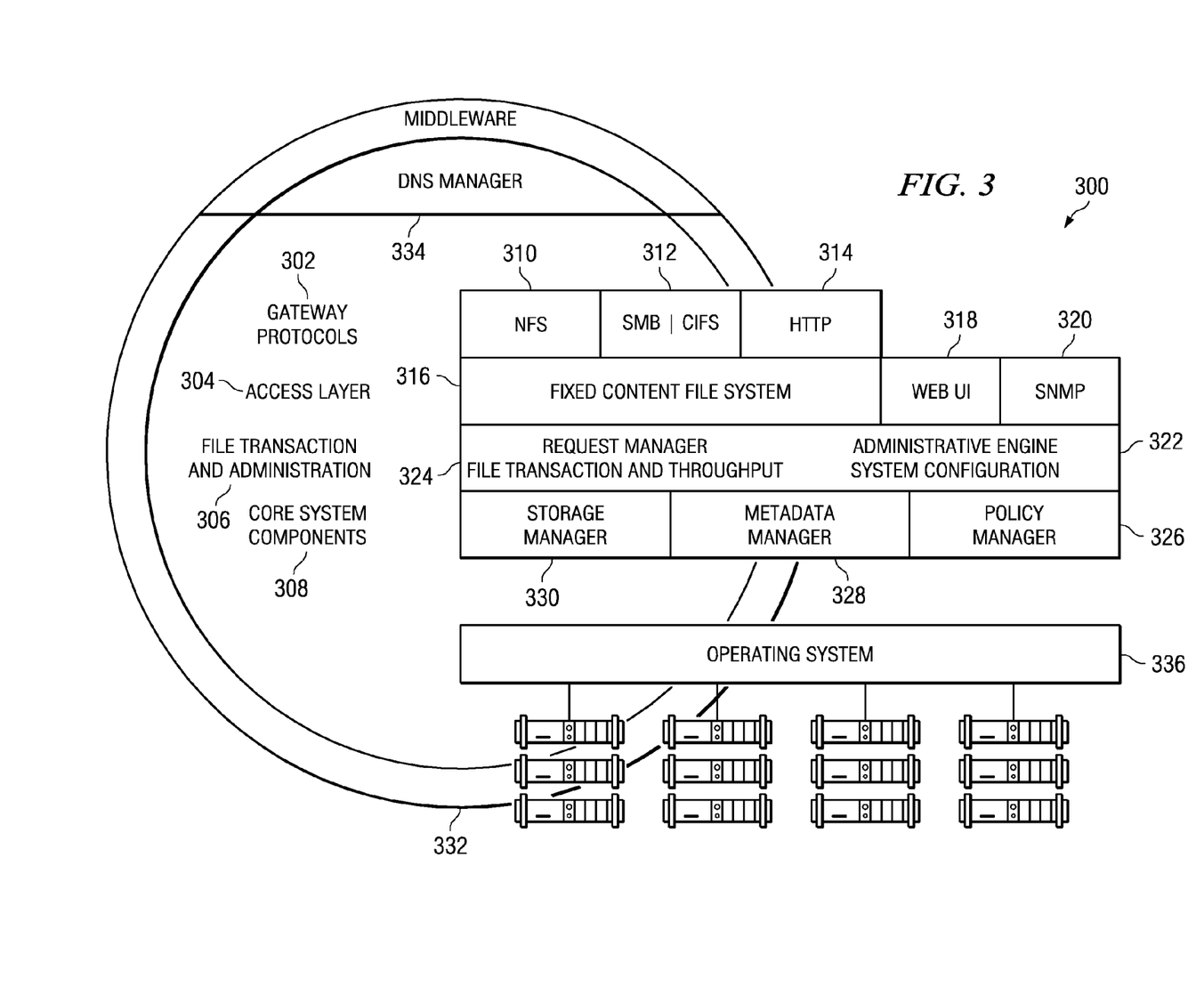
FIG. 3 is a high level representation of the various components of the archive cluster application executing on a given node.

The gateway protocols in the gateway protocol layer 302 provide transparency to existing applications. In particular, the gateways provide native file services such as NFS 310 and SMB/CIFS 312, as well as a Web services API to build custom applications. HTTP support 314 is also provided. The access layer 304 provides access to the archive. In particular, according to the invention, a Fixed Content File System (FCFS) 316 emulates a native file system to provide full access to archive objects. FCFS gives applications direct access to the archive contents as if they were ordinary files. Preferably, archived content is rendered in its original format, while metadata is exposed as files. FCFS 316 provides conventional views of directories and permissions and routine file-level calls, so that administrators can provision fixed-content data in a way that is familiar to them. File access calls preferably are intercepted by a user-space daemon and routed to the appropriate core component (in layer 308), which dynamically creates the appropriate view to the calling application. FCFS calls preferably are constrained by archive policies to facilitate autonomous archive management. Thus, in one example, an administrator or application cannot delete an archive object whose retention period (a given policy) is still in force.

The access layer 304 preferably also includes a Web user interface (UI) 318 and an SNMP gateway 320. The Web user interface 318 preferably is implemented as an administrator console that provides interactive access to an administration engine 322 in the file transaction and administration layer 306. The administrative console 318 preferably is a password-protected, Web-based GUI that provides a dynamic view of the archive, including archive objects and individual nodes. The SNMP gateway 320 offers storage management applications easy access to the administration engine 322, enabling them to securely monitor and control cluster activity. The administration engine monitors cluster activity, including system and policy events. The file transaction and administration layer 306 also includes a request manager process 324. The request manager 324 orchestrates all requests from the external world (through the access layer 304), as well as internal requests from a policy manager 326 in the core components layer 308.

In addition to the policy manager 326, the core components also include a metadata manager 328, and one or more instances of a storage manager 330. A metadata manager 328 preferably is installed on each node. Collectively, the metadata managers in a cluster act as a distributed database, managing all archive objects. On a given node, the metadata manager 328 manages a subset of archive objects, where preferably each object maps between an external file ("EF," the data that entered the archive for storage) and a set of internal files (each an "IF") where the archive data is physically located. The same metadata manager 328 also manages a set of archive objects replicated from other nodes. Thus, the current state of every external file is always available to multiple metadata managers on several nodes. In the event of node failure, the metadata managers on other nodes continue to provide access to the data previously managed by the failed node. This operation is described in more detail below. The storage manager 330 provides a file system layer available to all other components in the distributed application. Preferably, it stores the data objects in a node's local file system. Each drive in a given node preferably has its own storage manager. This allows the node to remove individual drives and to optimize throughput. The storage manager 330 also provides system information, integrity checks on the data, and the ability to traverse local directly structures.

As illustrated in FIG. 3, the cluster manages internal and external communication through a communications middleware layer 332 and a DNS manager 334. The infrastructure 332 is an efficient and reliable message-based middleware layer that enables communication among archive components. In an illustrated embodiment, the layer supports multicast and point-to-point communications. The DNS manager 334 runs distributed name services that connect all nodes to the enterprise server. Preferably, the DNS manager (either alone or in conjunction with a DNS service) load balances requests across all nodes to ensure maximum cluster throughput and availability.

In an illustrated embodiment, the ArC application instance executes on a base operating system 336, such as Red Hat Linux 9.0. The communications middleware is any convenient distributed communication mechanism. Other components may include FUSE (Filesystem in USErspace), which may be used for the Fixed Content File System (FCFS) 316. The NFS gateway 310 may be implemented by Unfsd, which is a user space implementation of the standard nfsd Linux Kernel NFS driver. The database in each node may be implemented, for example, PostgreSQL (also referred to herein as Postgres), which is an object-relational database management system (ORDBMS). The node may include a Web server, such as Jetty, which is a Java HTTP server and servlet container. Of course, the above mechanisms are merely illustrative.

The storage manager 330 on a given node is responsible for managing the physical storage devices. Preferably, each storage manager instance is responsible for a single root directory into which all files are placed according to its placement algorithm. Multiple storage manager instances can be running on a node at the same time, and each usually represents a different physical disk in the system. The storage manager abstracts the drive and interface technology being used from the rest of the system. When the storage manager instance is asked to write a file it generates a full path and file name for the representation for which it will be responsible. In a representative embodiment, each object to be stored on a storage manager is received as raw data to be stored, with the storage manager then adding its own metadata to the file as it stores it to keep track of different types of information. By way of example, this metadata includes: EF length (length of external file in bytes), IF Segment size (size of this piece of the Internal File), EF Protection representation (EF protection mode), IF protection role (representation of this internal file), EF Creation timestamp (external file timestamp), Signature (signature of the internal file at the time of the write (PUT), including a signature type) and EF Filename (external file filename). Storing this additional metadata with the internal file data provides for additional levels of protection. In particular, scavenging can create external file records in the database from the metadata stored in the internal files. Other policies can validate internal file hash against the internal file to validate that the internal file remains intact.

As noted above, internal files preferably are the "chunks" of data representing a portion of the original "file" in the archive object, and preferably they are placed on different nodes to achieve striping and protection blocks. Typically, one external file entry is present in a metadata manager for each archive object, while there may be many internal file entries for each external file entry. Typically, internal file layout depends on the system. In a given implementation, the actual physical format of this data on disk is stored in a series of variable length records.

The request manager 324 is responsible for executing the set of operations needed to perform archive actions by interacting with other components within the system. The request manager supports many simultaneous actions of different types, is able to roll-back any failed transactions, and supports transactions that can take a long time to execute. The request manager also ensures that read/write operations in the archive are handled properly and guarantees all requests are in a known state at all times. It also provides transaction control for coordinating multiple read/write operations across nodes to satisfy a given client request. In addition, the request manager caches metadata manager entries for recently used files and provides buffering for sessions as well as data blocks.

A cluster's primary responsibility is to store an unlimited number of files on disk reliably. A given node may be thought of as being "unreliable," in the sense that it may be unreachable or otherwise unavailable for any reason. A collection of such potentially unreliable nodes collaborate to create reliable and highly available storage. Generally, there are two types of information that need to be stored: the files themselves and the metadata about the files.

The above is a description of a known archive cluster. The following describes how an enterprise (or other entity) can implement distributed clusters and provide cluster replication and recovery.

Cluster Recovery

The following terminology applies to the subject matter that is now described:

Replication: a process that efficiently copies data from a primary cluster to a replica cluster. Under normal operating conditions, an authoritative namespace on the primary cluster is a source of data that is copied to a backup namespace on a replica cluster.

Primary cluster (PC): a cluster that contains the authoritative namespace under normal operating conditions. The primary cluster is sometimes referred to as the "source." Preferably, the primary cluster designation does not change during failover or fail-back procedures. Although not meant to be limiting, the primary cluster typically is identified with a geographic location. During the failure of a primary cluster, it will temporarily cease to provide the authoritative namespace and may become a backup namespace during recovery. When recovery is complete, the primary cluster typically resumes its role as authoritative namespace. Some recovery scenarios may permanently replace a failed primary cluster with a new primary cluster, possibly operating at a new location.

Replica cluster (RC): a cluster that provides a backup namespace under normal operating conditions. The replica cluster is sometimes referred to as a "target" or "replica." Although not meant to be limiting, typically the replica cluster is commonly identified with a geographic location. Preferably, the replica cluster designation does not change during failover or fail-back procedures. During a failure of the primary cluster, a replica cluster can provide authoritative namespace to clients.

Namespace (NS): a logical container for a set of files and directories. A namespace provides context for the objects it holds and allows disambiguation of items having the same name (residing in different namespaces). Preferably, it provides a complete filesystem tree. This allows files with identical names to coexist on the same cluster as long as they are in different namespaces. A cluster can provide a namespace as either authoritative (writable by external clients) or backup (read-only by external clients). A cluster can simultaneously host multiple Namespaces in different roles.

Authoritative namespace (AN): a writeable namespace that has the most up-to-date versions of the objects contained in it. Preferably, at any given time only one Authoritative namespace can exist for a given set of objects. A cluster can be configured to replicate from an authoritative namespace on a primary cluster to one or more backup namespaces hosted by replica clusters. A cluster providing an Authoritative namespace may be demoted to provide a backup namespace. During both failover and recovery, a namespace may temporarily have no authoritative copy.

Backup namespace (BN): a namespace that is not writeable by external clients and receives its data from an Authoritative namespace through the process of replication. Because replication is not synchronized with gateway access, the replicated data must always be considered out-of-date. A cluster providing a backup namespace may be promoted to providing the authoritative namespace during the process of failover.

Replication: a process that efficiently copies data from a primary cluster to a replica cluster. Under normal operating conditions, an authoritative namespace on the primary cluster is a source of data that is copied to a backup namespace on a replica cluster.

Failover: in the event of a failure of the primary cluster, failover is the process of a replica cluster converting from providing a backup namespace to an authoritative namespace. As part of this process, cluster clients can be redirected from the primary cluster to the replica cluster.

Recovery: a process that rapidly and efficiently copies data from a replica cluster to a primary cluster. Fast recovery is enabled by transferring metadata separately from the fixed content data originally replicated from the PC to the RC. Once the metadata is restored back at the PC, the PC can immediately resume its control over the first archive. The recovery process is performed after the primary cluster has failed over to a replica cluster and the primary cluster has been repaired and/or replaced. The authoritative namespace on the replica cluster copies its data to the backup namespace on the primary cluster.

Fail-back: at the completion of the recovery process, failback is the process of a replica cluster converting from providing an authoritative namespace to a backup namespace and a primary cluster converting from providing a backup namespace to an authoritative namespace. As part of this process, cluster clients can be redirected from the replica cluster to the primary cluster.

Link: a configured association between two clusters for the purpose of replication. A link describes how a set of data will be replicated from source to target. In one embodiment, the smallest "set of data" is a namespace. A link's configuration typically includes a source cluster DNS name, a target cluster DNS name, a replication schedule, transport configuration, the namespace to be replicated, and authentication information.

Change log: an ordered list of changes for a given source-cluster region and time range. Within a change log, each object may have many changes.

Complete change log: a change log that only contains complete change descriptions.

Change: a change in state for a given archive object, often stated in terms of the motivating gateway operation, e.g., creation, deletion, setRetention, and the like. Changes are typically only made on the source cluster and must be identified and migrated to the target cluster.

Change description: a collapsed and partial view of the one or more changes to an archive object. The change description notes the fact of the change and the desired end state of the object after the change. Change descriptions preferably are constructed with information available from an archive database as opposed to internal files. For some operations (like close user metadata or file create), the change description does not include all data necessary to represent the change; for these operations the change description must include a reference to a source of the data needed.

Local change description: a change description that is either a complete change description or a change description where all referenced data is contained in the local cluster.

Remote change description: a change description that is not complete and contains references to data in a remote cluster. The remote cluster is identified in the containing change log.

Invisible file: an archived file that is not accessible through any gateway. These files are used as a safe, intermediate store of records that may eventually be added to the database. Invisible file content is usually a message layer-encoded structure, but this is not a limitation.

Administrator: the person responsible for cluster administration. This person typically has an admin password for their cluster and is tasked with cluster configuration and management. This term is often prefixed by the replication cluster that he or she administers.

Figure 4:
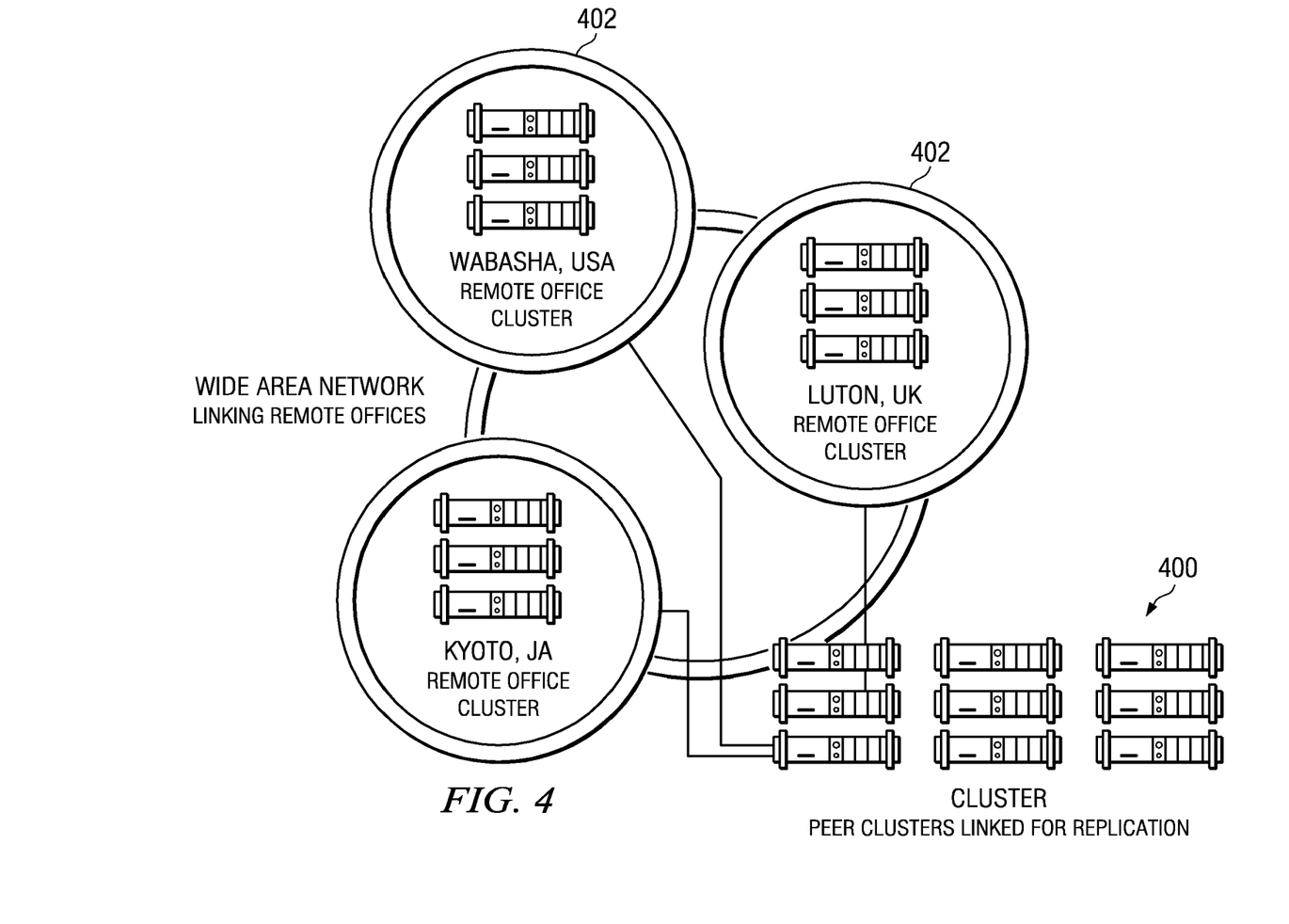
FIG. 4 represents how content is replicated to one or more remote archive sites to facilitate archival-based business continuity and/or disaster recovery according to the subject disclosure.

FIG. 4 illustrates a Primary cluster 400 together with a three Replica clusters 402 (one located in Wabasha, USA, one located in Luton, UK, and one located in Kyoto, JP). Typically, clusters are located in different geographic locations, although this is not a limitation or requirement. Content is replicated (through replication process) from the PC 400 to each RC 402 enabling business continuity and disaster recovery. Thus, in the event of an outage, client applications can Failover to the replica cluster minimizing system downtime. Restore functionality (the recovery process) provides rapid re-population of a new primary cluster, which may be either the re-built/re-stored original PC, or an entirely new PC.

Figure 5:
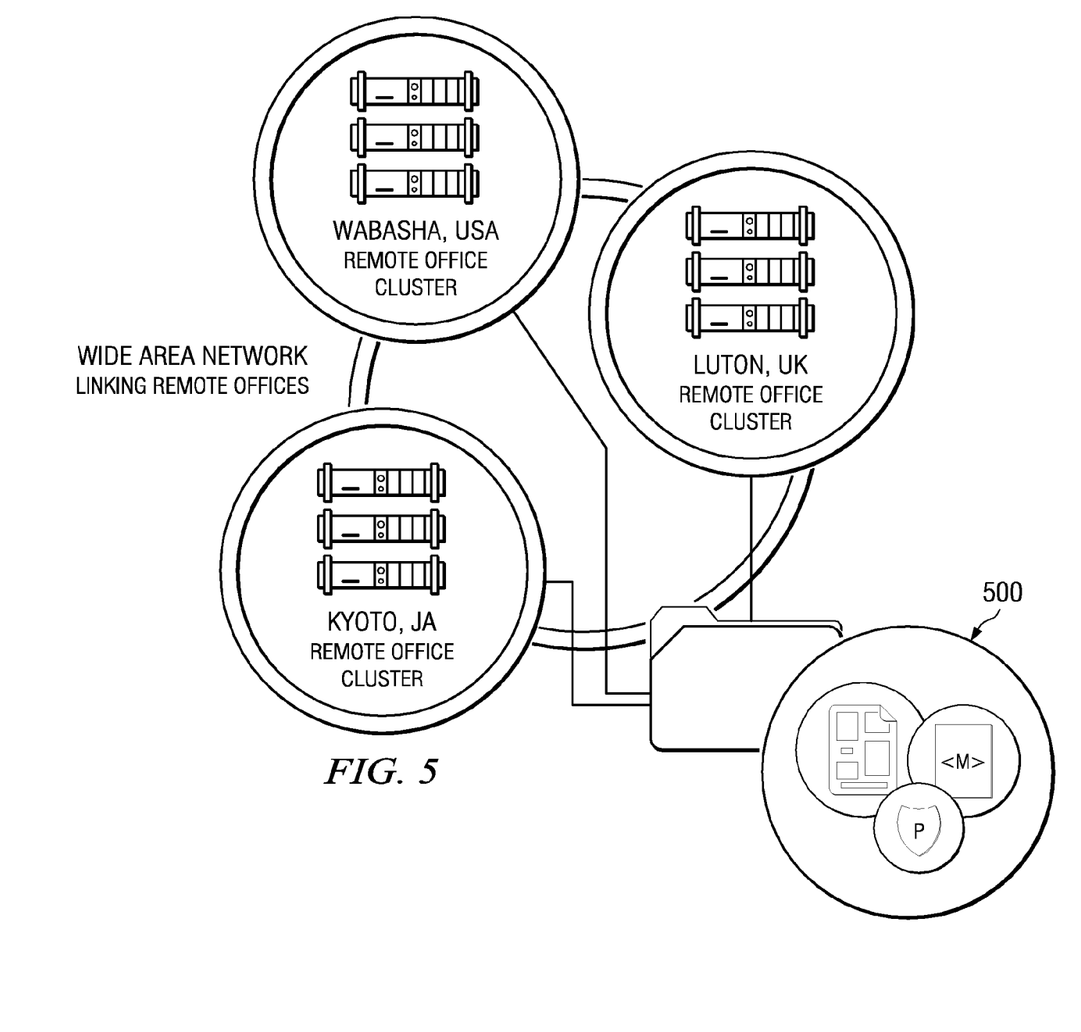
FIG. 5 represents how an administrator can create links between clusters to facilitate object level replication according to this disclosure.

FIG. 5 illustrates an administration console graphical user interface (GUI) 500 that allows creation of replication Links between clusters. As noted above, a link enables a source namespace to be replicated to a specified target cluster. The link may be configured with one or more options. Thus, a digital signature option may be selected to guarantee authenticity of the link. A compression option may be selected to enable data compression across the link to minimize WAN bandwidth requirements. An encryption option may be selected to enable encryption (e.g., SSL) to be used if the link needs to be secured, which may be the case if the link encompasses a public network (such as the Internet). In addition, a scheduling option enables selection of when replication should take place, and how aggressive the replication should be. These options preferably are each configured by the Administrator. Preferably, archive objects are replicated from a PC to one or more RCs in a synchronized and secure manner.

Preferably, replication is tracked at the object level, which includes fixed content data, metadata, and policy information (e.g., shredding attributes, and the like). The GUI may also expose metrics that include, for example, replication progress in terms of number of objects and capacity. Any archive may include a machine through which an Administrator can configure an archive for replication, recovery and fail-back according to this disclosure.

Multiple replication topology configurations may be implemented. A simple configuration involves one primary cluster that replicates its data objects to just one replica cluster. This is a 1-to-1 (PC to RC). One PC may replicate its data to more than one PC, as illustrated in FIG. 4. This 1-to-many approach may be costly depending on the storage cost. A "many-to-1" configuration may be used where multiple primary clusters replicate to a large central replicate cluster. In a "bi-directional" approach, first and second clusters replicate to one another. A "multi-hop" approach, A replicates to B and then B replicates to C. Hybrid configurations (involving combinations of the above) may also be implemented. Regardless of the topology implemented, preferably a given topology is created by a cluster administrator using one or more replication links. Preferably, the link configuration determines the ultimate replication network topology. Moreover, preferably link creation is point-to-point. For example, to set up a one-to-many topology, the primary cluster administrator would create links to each RC. The RC Administrators would each then complete the creation of those links. The multi-hop configuration adds additional requirements, as the link configuration would need to understand the "chain" concept to allow for the restoration of data through either the intermediate cluster or directly from the end replica.

Figure 6:
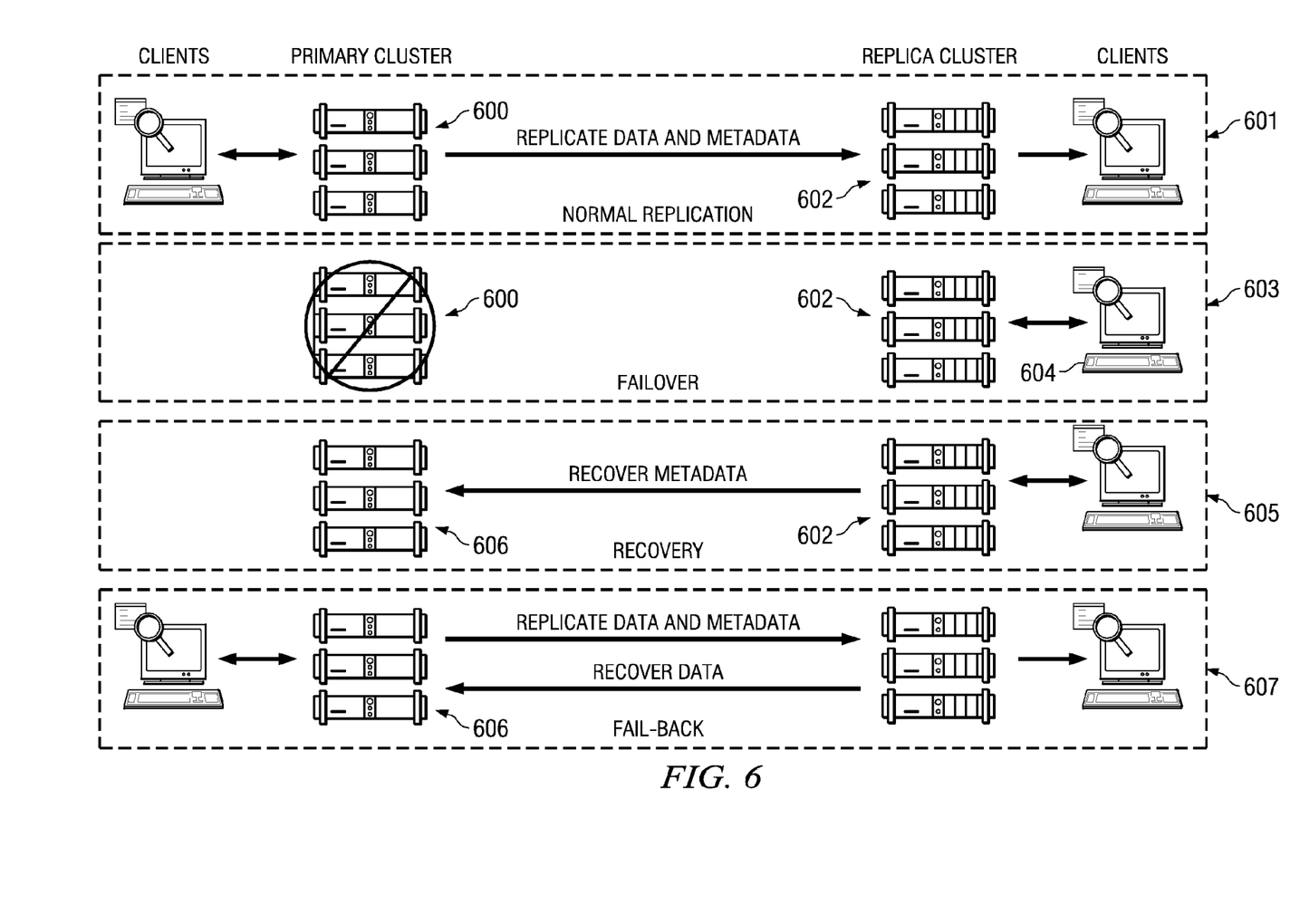
FIG. 6 illustrates a first use case involving Primary cluster failure in a unidirectional topology.

FIG. 6 illustrates a first use case involving primary cluster failure in a unidirectional topology. In this embodiment, cluster 600 is the PC and it is replicating to cluster 602, the RC. This is step 601. Thus, RC is a dedicated replica for cluster 600. Assume now that PC suffers a complete failure. This is step 603. RC administrator uses an administrator GUI to promote cluster 602 to be authoritative for namespace of cluster 600. As a consequence, the clients 604 for cluster 600 are redirected to read/write to B. Later, assume that a new cluster 606 is installed to replace cluster 600. The administrator of cluster 606 goes into the administrator UI and re-establishes the link to cluster 602. At step 605, the administrator of cluster 602 then goes into its UI and initiates a recovery. When the recovery is complete (or close to being completed), the administrator for cluster 602 marks the namespace as being "read-only." Cluster 602 completes the transfer of the metadata to new cluster 606 and then sends a message to cluster 606 to instruct cluster 606 to go into a read/write mode. This completes the recovery. At this point cluster 606 has resumed control and clients are redirected from cluster 602 to cluster 606. Preferably, replication then continues in both directions, as indicated at step 607. In particular, cluster 606 continues to pull the data from cluster 602 while providing read/write access to clients (the original clients of cluster 600). This operation continues until all data is repaired to cluster 606. At the same time, cluster 606 continues to replicate all new changes to cluster 602, which has returned to its RC status.

The operation shown in FIG. 6 is the same for a partial failure of the PC, in which case the PC is simply repaired as opposed to being entirely replaced.

Once the metadata has been restored to the first cluster, clients can read all data from the first cluster. At this point, the archive will retrieve content not yet restored from the second cluster on behalf of the client. Typically, the client is not redirected and is not aware that the content has not been restored. The client may experience reduced performance during the read as the data is pulled from the second cluster.

Figure 7:
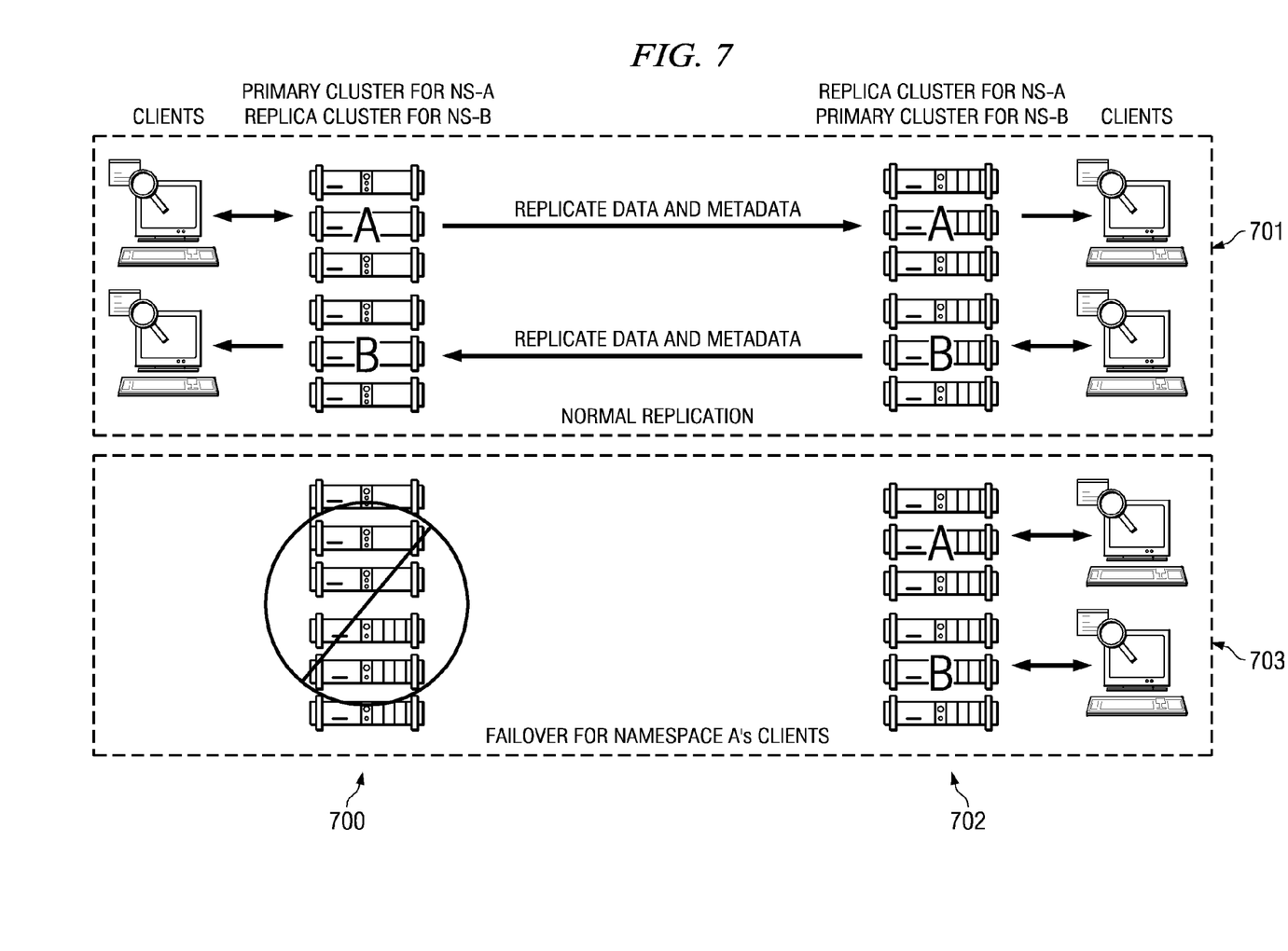
FIG. 7 and FIG. 8 illustrate the failover and recovery phases for a second use case involving a bi-directional topology.
Figure 8:
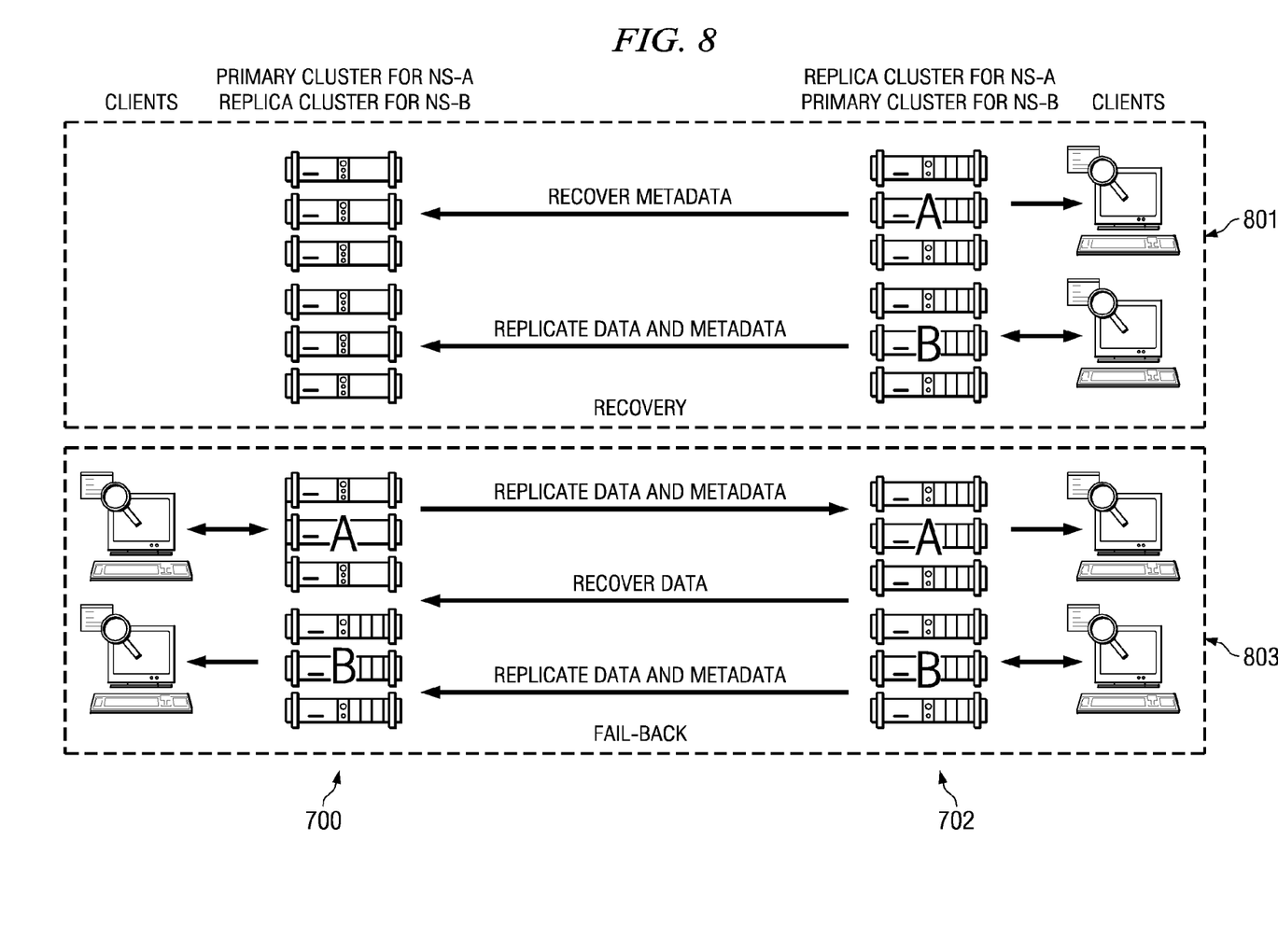

FIG. 7 and FIG. 8 illustrate the failover and recovery phases for a second use case involving a bi-directional topology. In this embodiment, each cluster is replicating to the other. Thus, cluster 700 is the primary cluster for namespace A that is replicated to cluster 702; cluster 702 is the primary cluster for namespace B that is replicated to cluster 700. Step 701 illustrates the normal bi-directional replication. At step 703, cluster 700 has failed. As described above, namespace A's clients are then directed to the cluster 702. As illustrated in FIG. 8, fast cluster recovery has been initiated at cluster 702 according to the disclosure herein. (In this example, it is assumed that cluster 700 has been brought backup as opposed to being completely replaced with a new cluster, as in the FIG. 6 embodiment). The recovery phase is step 801. After cluster 700 is stood-up, namespace A's metadata is provided from cluster 702 back to cluster 700 as indicated by the arrow. While such recovery is on-going, namespace A clients continue to get directed to cluster 702 for service. At the same time, namespace B begins replicating again to cluster 700. When recovery is complete, the fail-back phase is initiated, as indicated at step 803. At this point, namespace A begins replication again to cluster 700. Data (originally replicated from cluster 700 to cluster 702) is then restored to namespace A in cluster 700; because of the fast recovery of metadata, however, clients of namespace A can be serviced from cluster 700 as soon as the recovery phase (step 801) is completed without having to wait for the data to be restored to the cluster 700.

The following provides additional details regarding replication, failover, and recovery.

Replication

A replication manager provides a top level parent of other replication components. Its job is to be a coordinator for the whole replication process as well as repository for configuration and replication state knowledge. The normal control flow for the replication manager is as follows. After startup, the replication manager loads a configuration. For each replication link, the replication manager then cycles through the following algorithm: create replication link object; register for scheduler events; create copy object; determine if the link is a namespace master and, if so, call a copy.startSending function( ); otherwise (i.e., if the link is not a namespace master), call a copy.startReceiving function ( ). The replication manager responds to any scheduler/priority changes by calling a function copy.setPriority ( ) on the appropriate link. The replication manager responds to any shutdown needs by calling a function copy.shutdown ( ) on all links.

The replication manager is responsible for all top level control of the copy process. Preferably, both ends of the replication link run through the same algorithm. No cross-cluster control communication is required in this process, as both ends just start and stop based on their schedules. Only when a link is paused on one end is a message sent to the replication manager on the other end to pause processing.

The "normal" control flow and the "restore" control flow are almost identical except for some differences in control flags that are passed to the copy process.

Preferably, the replication manager is started by the administrative engine (see FIG. 3). As noted above, it loads replication configuration and builds the set of one or more Replication links with this configuration. Preferably, the replication manager registers with a scheduler to receive notifications for all start, stop and priority change notifications, and it uses this information in its role as coordinator to notify the links that need to change behavior. When the scheduler starts/stops tasks the replication manager coordinates the replication worker threads associated with this link. This includes a change log collection component for each link. Once the links are scheduled, the replication manager just handles "start" events arriving from the scheduler and dispatches the appropriate link. As noted above, when the link receives a start message is creates a copy object and calls startSending or startReceiving on the copy object depending on the state of the namespace (authoritative or backup). As priority changes come in from the scheduler, the replication manager informs the appropriate links about the state change via setPriority. The copy process adjusts to the change in priority at a convenient time. When it is time to shutdown, the replication manager informs the links. They will, in turn, call shutdown no the copy processes, which will immediately terminate the copy process.

Link Management

As used herein, a replication link is a configured association between two clusters for the purpose of replication. Link management involves the creation, modification and deletions of these associations. A link manager implements this functionality.

Link Creation

When an association between two clusters is needed for the purpose of replication, a replication link needs to be created. For security reasons, which are discussed below, preferably this is a two-step process that involves Administrators from both the primary and replica clusters.

To start the process, the PC administrator uses an admin UI to start the creation of a replication link. Preferably, the administrator is required to provide a DNS name of the RC, some priority and schedule information, and possibly some authentication information (username/password). This operation creates a configuration object in the PC containing this information and sends a message to the replication manager on the RC requesting that the link be created. This message typically contains the following information: a primary cluster DNS name; authentication information, and the public part of the primary cluster's server SSL certificate (if SSL will be used); a transport configuration for the replication (e.g., HTTP, HTTP over SSL, or the like); the namespace to be replicated; a flag describing if the data traffic should be compressed. The replica cluster stores this information in a configuration object locally and presents the replica administrator the request in the admin UI. The replica administrator can then choose to either accept or reject the request. Preferably, n replication operations are permitted until the link has been created and authorized by both administrators. If the namespace already exists, preferably the link creation fails. If desired, a safe messaging protocol may be used to create the link where the state of the create exchange is recorded on the primary cluster side. If the "created" response never comes back, the primary cluster administrator is given the option to retry the create operation. The create message preferably contains a unique ID to prevent replay issues. If the Link authorization message is received from the replica then the system can assume that the link was created correctly, even if a response from the original create message is never received.

The configuration state on the primary cluster preferably is not persisted until the successful response from the replica cluster is received. Preferably, the link creation message contains a unique identifier so that the remote cluster can detect retries versus invalid duplicate requests. Some failure cases may require the replica cluster administrator to delete the partially created link. The persisted link configuration is fairly static, and link state (running, paused, etc.) is persisted in the replication manager. Once the link is created, the primary cluster can use the configured information to locate the replica cluster (through DNS) and begin replication operations. Each cluster can use its SSL server certificate as a client certificate for authentication to the other cluster. If the message from the primary cluster to the replica cluster fails, the link creation should fail and the PC administrator needs to start the process again.

Link Modification

Schedule, priority, transport and compression settings all can be modified on an existing link. For all other changes, preferably the link must be deleted and recreated.

Link Deletion

A replication link can be deleted by either administrator. If network connectivity between the two clusters is up, a message is sent to the remote cluster requesting that the link be deleted on that side as well. If the remote cluster cannot be contacted, only the local link configuration is deleted.

When a link is deleted, the configuration state on that side is deleted and the message is sent to the remote side. The remote side marks the link down, but does not delete any state. When the remote administrator deletes the link, state is cleaned up. Also, all change set tracking state is deleted at this time. When the administrator of a replica deletes a link, he or she is given the option of deleting the namespace associated with that link. The delete link exchange preferably uses the same "safe" message protocol as the link creation process. If a PC attempts to replicate information to a replica that does not have a corresponding link configured on the remote side, the replication is rejected.

Link State

Replication links can be paused. This immediately stops all change set creation and sends a message to the replica cluster to stop requesting data. Replication does not continue for that link until it is resumed by the administrator. The paused or resumed state is persisted with the rest of the link configuration so that a cluster restart will not incorrectly resume replications.

Security

As noted above, preferably SSL security with client-side certificates are used for replication link security needs.

Failover

Failover is the process of allowing cluster clients to continue to read and write data to the replica a failure of the primary cluster. Failover typically comprises several steps: identifying a failure, changing the primary to disallow writes (if possible); processing any write backlog on the replica; changing the replica to allow writes; and redirecting clients to use the replica.

Preferably, there is never more than one writable cluster for a given set of data at any point in time. The failover process ensures insure that a read/write copy of the data is available whenever possible while preventing two writable copies from existing.

Identifying a Failure

Typically, a cluster failure is identified by an administrator. If desired, automatic failover may be implemented, although this is not a preferred technique as it is often difficult to automatically distinguish between a primary failure and a primary-replica network failure. The latter might lead to two writable copies and potentially conflicting changes. Moreover, even if the failure of the primary can be accurately detected, there is no way for the replica to inform clients that they would need to switch to using the replica.

Changing the Primary to Disallow Writes

If the primary is available in some capacity, but the administrator has decided to failover to the replica, the primary namespace must first be marked read-only. Preferably, this is a manual operation performed in the admin UI by the primary cluster administrator. The manual configuration is desirable, as having clients write to the same namespace on both the primary and replica sides can potentially cause very difficult to resolve naming conflicts.

Processing the Backlog

Preferably, metadata and data move over in different phases of the data copy (replication) process. If this is case then when a failure occurs, it is probable that metadata exists on the replica that needs to be processed. Also, if the primary cluster is not available, the data associated with this metadata is not accessible. In this case, once the administrator has signaled his or her intention to failover (to go writable), preferably all the metadata must be processed as quickly as possible.

Changing the Replica to Allow Writes

Preferably, the process of switching a replica to accept writes is a manual one that is performed by the replica cluster administrator. In the admin UI, the replica cluster administrator selects the link or set of links that are down and starts providing read/write access for the data replicated on those links. The namespace(s) served by those links are then marked as read/write and the cluster will accept incoming writes for each such namespace.

Redirecting Clients to Use the Replica

The client can be directed to point to the replica at the client, in DNS, or in the network between the clients and clusters.

Recovery

Recovery is initiated by the administrator via a UI "recover" button at the replica cluster. There are two main conditions that should be met for this button to be active: the primary cluster (master) namespace is empty (not required to support partial recovery, described below); and the PC namespace is in read-only mode. The primary cluster namespace will be empty in the case of a catastrophic failure, as typically a newly-installed cluster will be required. If the source cluster failure is not catastrophic, the primary cluster namespace typically must be emptied (not required to support partial recovery).

Partial Recovery

Within a given cluster, there may be one authoritative copy, and zero or more backup copies. The number of backup copies may be controlled by a configuration parameter, which is sometimes referred to herein as a number of "tolerable points of failure" (TPOF). If a Primary cluster loses more than TPOF+1 nodes, it is not optimal to wipe all data on the cluster and force a full restore. Similarly, if TPOF+1 failures occur in a replica cluster, it is also not ideal to wipe the entire replica and re-replicate the master. Both cases benefit from a partial restore.

Thus, during a TPOF+1 failure on the primary cluster, replication failover proceeds as it does with a complete failure. During a TPOF+1 failure on the replica cluster, however, no failover occurs. During a TPOF+1 failure on both clusters, no failover can occur as neither system can support gateway load. In such case partial repair is conducted twice in succession, once from each direction. This partial recovery process identifies recoverable lost data and creates appropriate change logs and, as necessary, reports on unrecoverable loses.

Copy

Preferably, a bulk copy process is implemented for data flows during the replication, recovery and fail-back stages.

Bulk copy preferably leverages a batching approach to loading data into the archive. On the source cluster, and for each cluster region, the process collects and moves change descriptions to the target cluster. At the point each change log is saved on the target, the system knows what changes need to be copied. If the source fails after this step, the system also knows what changes have been lost. The process also pulls data referenced by each change description to the target cluster and marks each log as "accepted." At this point, copy of the changes in the log is guaranteed to complete successfully. In other words, the fixed content data and metadata have been copied. If the source fails after this step, no data is lost. The process also uploads accepted changes into a database in the target cluster and marks the changes as "integrated." At this point, the copied change is available for read access via all gateways in the target cluster. If the source fails at this point, all Changes are immediately available.

During the bulk copy process, any particular change can be at any stage of the copy pipeline. The stages are not atomic. For a given copy run, any stage may be partially complete, meaning that some changes have finished that stage and some have not. The stages typically all take different time periods. Subsequent stages may begin before prior stages complete, but subsequent stages typically cannot complete until prior stages complete.

The bulk copy process has several behavior variations. Initial replication begins with an established primary cluster and a new replica cluster. A highest priority is initially to copy all data from the PC to the RC. The replica's ability to host additional namespaces and support read access for the replicated namespace can be optionally postponed to allow the initial replication process to catch up as fast as possible.

Normal replication is a continuous process. Ensuring that metadata and content data are safely copied from the primary cluster to the replica cluster typically is an important consideration. In particular, replicated files must be available for gateway read access. This read access, however, is of secondary concern and may lag behind the copy process. Replicated files must be available for repair of the primary cluster in the event of a failure. Repair availability is also secondary to the initial copy from the primary cluster. Some measured lag between a primary cluster failure and the initiation of repair is acceptable.

For recovery, it is important to re-establish the primary as the namespace authority as fast as possible. As namespace authority, the primary can then reassume both read and write gateway support. It is acceptable to suffer a gateway read performance penalty for a limited time if this tradeoff provides a faster transition to namespace authority. If a recovering replica is a completely new cluster, disaster recover is the primary concern over other cluster uses. For example, establishing additional namespace support in the cluster is a secondary concern and may be delayed until after the recovering namespace becomes authoritative. Establishing early support for gateway read access is also a secondary concern to write support. Read and write gateway access support may occur at the same time if this delay for read support accelerates the write support.

A single bulk copy process supports all replication requirements. Preferably, two bulk-copy attributes are specified to control behavior details that should apply to each replication scenario. A first attribute is an "index free" attribute, which may be used for initial replication, and also for recovery, when a large amount of data is to be copied. This attribute should be specified when the target is guaranteed to be collision-free (e.g., it starts empty) and no other system process requires metadata access; in this case, the copy process can optionally drop database indexes, load all metadata records, and then add the indexes. A second attribute is a "metadata first" attribute, which is used during recovery and an early transition to primary status is required. This is the "fast recovery" option that is implemented in a preferred embodiment herein. When this attribute is specified, as soon as all metadata is loaded (e.g., into the cluster database), a namespace is immediately eligible to become authoritative irrespective of whether the fixed content data has even begun to be transferred back to the primary (let alone received). Indeed, in this option, metadata can be loaded into the database before any associated data is copied to the local cluster. To support read-through, a new remote data representation (in the primary) then indicates where the data is available on the remote (replica) cluster that is in active recovery.

Figure 9:
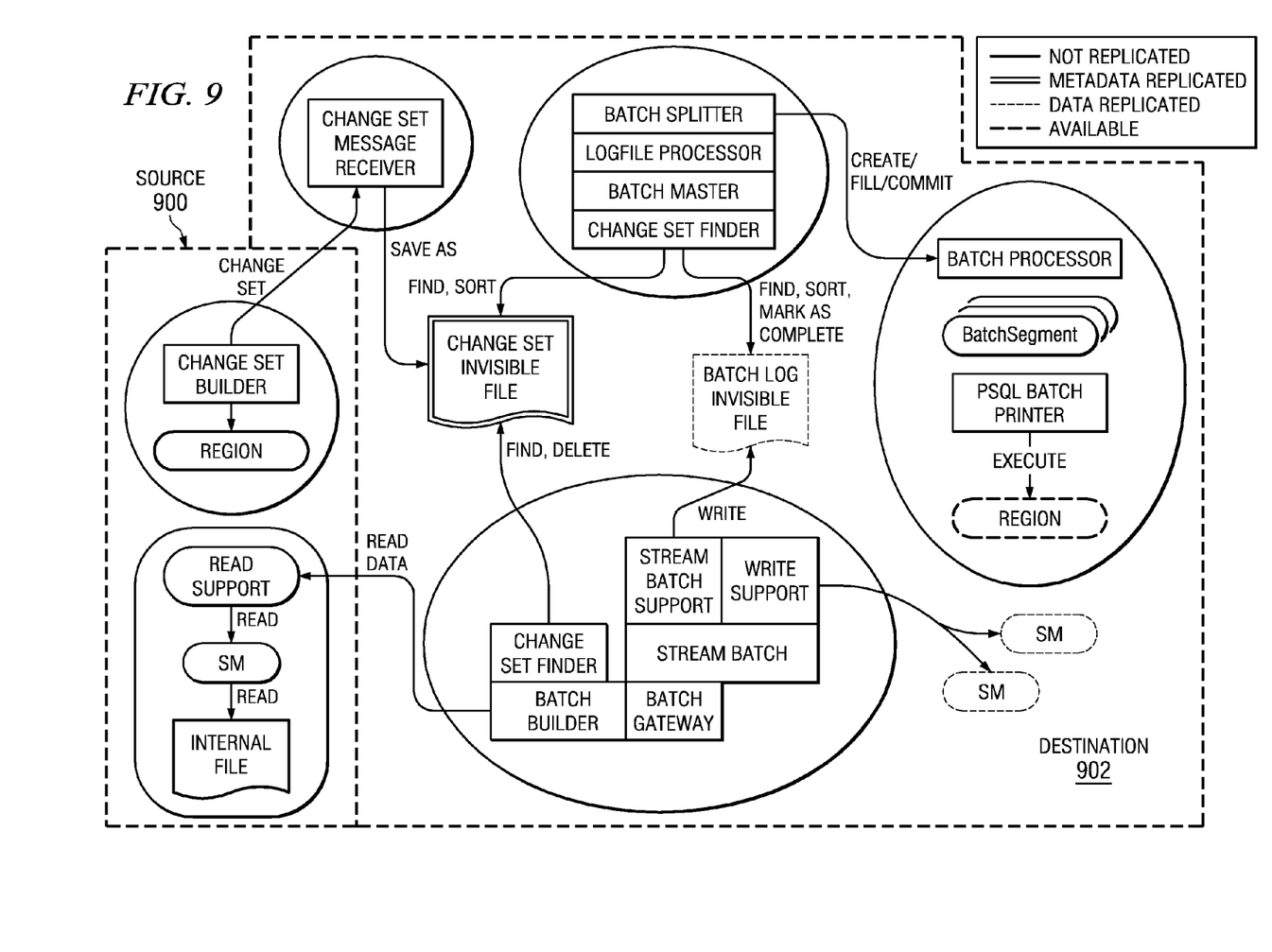
FIG. 9 depicts various processing states and data flow for a bulk move process from a source cluster to a destination cluster according to the invention.

FIG. 9 depicts the various processing states and data flow for the bulk move process from a source cluster 900 to a destination cluster 902. Data on the source archive begins as "Not Replicated," progresses through "Metadata Replicated," "Data Replicated," and finally to "Available" on the target cluster. Each of these transitions is made as a single transaction against one or many objects that are in an associated start-state. Note that the data in these states are not objects, but changes to objects. Preferably, the bulk-move process does not copy objects, but instead copies changes from the source archive to the target archive. For example, the "delete" change will include only the information needed to propagate a delete action that was performed on the source archive to the target archive. The "create object" change will necessarily include all data required to represent the new object.

The states shown in FIG. 9 are described as follows.

"Not Replicated": The amount of data in this state is bounded by a time period known to the target cluster. The target cluster has no other information about this data. If the source cluster fails completely, data in this state will be lost. The lost data will only be described by the bounded time period.

"Metadata Replicated": The metadata-attributes of the change have been replicated to the target cluster. These attributes commonly include the type of change and the name, owner, group, size, hash value, and other metadata properties of the changed object. Changes like "delete" are fully represented by metadata. These metadata-only changes can be successfully replicated if they reach this initial state. The "create object" change is not complete at this stage since the object-content has not been transferred. If the source cluster fails at this point, "create object" changes will be partially lost; the metadata for the change description will be preserved, by the associated file content will be lost.

"Data Replicated": At this stage, all the data needed to represent all changes has been copied to the target cluster. If the source cluster fails completely, all changes that have made it to this state can be completely replicated.

"Available": The replication process has completed for data in this state. The changes are available to clients accessing the target cluster.

The following provides additional details of the copy process, once again with reference to the state diagram FIG. 9. The various processes that perform these state transitions are shown and conveniently implemented in software. The boxes identify processes; where boxes are grouped together, the processes execute on a single node in the cluster. By way of background, the cluster typically includes a metadata management system that organizes and provides access to given metadata, preferably in the form of metadata objects. Each metadata object may have a unique name, and metadata objects typically are organized into regions. Further details regarding a representative metadata management system of this type are provided in Ser. No. 11/190,402, which is incorporated herein by reference.

First, changes are identified via a change log collection process running on the source cluster. Then, changes are transferred to the target cluster as they are collected. No storage of change logs occurs on the source cluster. Thereafter, change logs are received by a change log message receiver and saved as invisible files. If change log communication is reasonably random, saves can prefer a local storage manager (SM). The invisible files are labeled with the change log type (complete or remote, source cluster, domain, and time period). After successfully saving the invisible file, the change log message receiver acknowledges receipt with the sender. If the change log is not "complete," a batch build process is initiated with a local batch builder.

Remote change logs are then converted to local change logs according to the following sub-steps. First, the batch builder opens and parses the remote change log. Each change is examined. If the change description is complete, it is simply forwarded to the Batch Gateway. If the change description requires that data is pulled from the source cluster, a remote source transferable is created and passed to a batch gateway. Second, the provided remote source transferable may optionally hash retrieved content in-line and validate. If no external file hash was previously available for this file, the computed hash can be use in the target cluster. Minimally, the conversion process cross verifies the internal file hash from the source with the new internal file hash generated by the target storage manager. Third, the batch gateway is in this case directly called on the local node. For each change log, a new batch is created. A stream batch mechanism then constructs a local change log. The local change log inherits time range and domain information from the remote change log. Then, after the remote change log has been successfully transformed into a local change log, the remote change log is deleted. If any failure occurs, the remote change log is unchanged. Subsequently, retries will be attempted.

After the remote change logs are converted as just described, the single batch master running on the target cluster's leader node locates local change log stored in invisible files. The local change logs included in these invisible files are then sorted as follows: for a given time period, no change may be processed until all domains are safely stored (or the primary cluster is declared dead); and, for a given time period, the local change logs for all domains are processed before change logs for the next time period for any domain. Within a time period, domains may be executed in any order.

Thereafter, the batch master assembles batches that are sized to optimal on invisible file boundaries. An invisible file may not be split across batches. The batch master then parses the change logs as contained in the individual files and splits the entries across the target cluster regions as dictated by a current region map. Within each region a batch runner is created, receives change descriptions, and processes the commit. Within the batch runner a batch segment holds changes that correspond to the invisible file boundaries. When executing the commit, each batch runner walks the batch segments and generates instructions to the database to insert the needed rows. These instructions are then executed locally and sent as a message to all backup regions and executed. The instructions are rendered once.

Each batch segment generates the instructions in one of two forms. The form used is determined by querying for marker files that indicate the success or failure of any previously attempted run of the change log on the region. The two forms are as follows:

"Guaranteed new": if the first guaranteed new change is in fact new (not in the database), then the instructions generated can use an optimal form; or "Change if required": If the first guaranteed new change is possibly not new in either the authoritative or a backup region, then an insert-if-absent sql instruction is required.

When a batch commits successfully, all used local invisible files are deleted. If any part of the batch execution fails, then all used invisible files are left unchanged. Subsequent retries will re-visit these files indefinitely. Because the commit across the system is not atomic, replay of change logs by the batch master must be tolerated. The marker files described above ensure that transactions are only executed once against each region element (backup or authoritative).

The bulk copy approach described above thus splits the copy operation into two phases: bulk metadata, followed by data. Preferably, this bulk-move is used during replication and during restore. There is an important benefit provided by this metadata-first approach. In particular, asynchronous replication always implies some amount of data loss when the source cluster fails. Changes that have occurred on the source and not yet transferred to the target are lost. With the metadata-first approach, the data loss is reduced and more easily managed. Because metadata is sent first, the loss of metadata changes is relatively smaller. The transmission of metadata changes is not blocked by the (much larger, more network intensive) transmission of data. This means that, when a complete failure of the source occurs, the target can provide detailed loss reporting. Thus, for example, the target may generate a report indicating such data as the following: time duration prior to the failure (A) within which all changes to the source cluster are lost; and time duration prior to the failure (B) within which the data changes are lost, but the metadata changes were not lost. For example, during this period, a delete change would not be lost. A "write object" change would be partially lost; the name and attributes of the object would not be lost, but the content of the object would be lost. The report may also include a complete list of objects (with name, owner, size, and the like) that were written on the source cluster, but whose data was not replicated. These lost changes all occur within time (B). Note that A is strictly smaller than B and that B is no greater (and possibly smaller) than the loss window achieved with an object-by-object replication strategy. Because the lost files are known by name and size, and because the files were created immediately before the failure, this detailed reporting might be used to identify, locate, and manually recover other copies of these files that might survive on different systems in the enterprise.

The metadata-first strategy provides other benefits. In a bandwidth-constricted deployment, tradeoffs are often required. Because it is replicated first, up-to-date metadata is favored over up-to-date file content. With a good implementation of this strategy, the (A) period above can be constrained to seconds. The sacrifice in data not migrated is directly proportional to the size of the metadata. Because metadata changes (as opposed to data changes) require much less bandwidth to transmit, this might mean that just one megabyte-size file is sacrificed.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the present invention has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, and magnetic-optical disks, read-only memories (ROMs), random access memories (RAMs), magnetic or optical cards, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

As used herein, the word "location" is not necessarily limited to a "geographic" location. While clusters are typically separated geographically, this is not a requirement. A primary cluster may be located in one data center in a city, while the replica cluster is located in another data center in the same center. The two clusters may also be in different locations within a single data center.

Although the present invention has been described in the context of an archive for "fixed content," this is not a limitation either. The techniques described herein may be applied equally to storage systems that allow append and replace type modifications to the content.

Having described the invention, what we now claim is as follows.

The invention claimed is:

1. A storage method operating across a set of distributed locations, wherein at each location a redundant array of independent nodes are networked together to provide a cluster, and wherein each node of a cluster executes an instance of an application that provides object-based storage of fixed content data and associated metadata, comprising:
configuring an association between a first cluster and a second cluster;
replicating the first cluster's fixed content data and metadata from the first cluster to the second cluster;
upon a failure associated with the first cluster, redirecting clients of the first cluster to the second cluster; and
upon repair or replacement of the first cluster, having the repaired or replaced first cluster resume authority for servicing the clients of the first cluster upon receipt, from the second cluster, of the metadata, wherein the repaired or replaced first cluster resumes authority for the clients irrespective of whether the fixed content data has been transferred back from the second cluster.

2. The storage method as described in claim 1 wherein, during the replicating step, the first cluster's metadata is transferred from the first cluster to second cluster prior to the fixed content data.

3. The storage method as described in claim 1 wherein, upon repair or replacement of the first cluster, the first cluster's metadata is transferred from the second cluster to the repaired or replaced first cluster prior to the fixed content data.

4. The storage method as described in claim 3 wherein the metadata is transferred from the second cluster to the repaired or replaced first cluster by a bulk transfer process.

5. The storage method as described in claim 1 further including directing clients of the first cluster to obtain fixed content data from nodes in the repaired or replaced first cluster once the fixed content data has been restored to the repaired or replaced first cluster.

6. In a distributed storage system wherein a first cluster replicates metadata and content data to a second cluster, a method, comprising:
upon a failure associated with the first cluster, redirecting clients of the first cluster to the second cluster; and
bulk transferring the metadata to a repaired or replaced first cluster in advance of any transfer of the content data, the repaired or replaced first cluster resuming authority for servicing the clients of the first cluster as soon as the bulk transfer of the metadata is completed.

7. The method as described in claim 6 further including restoring the content data to the repaired or replaced first cluster following bulk transfer of the metadata.

8. The method as described in claim 7 wherein, in response to a client request, a read is performed in the first cluster and an associated content retrieval is performed in the second cluster until the content data has been restored to the repaired or replaced first cluster.

9. The method as described in claim 6 wherein the metadata and content data are associated with a namespace for which the first cluster is authoritative.

10. The method as described in claim 6 wherein each of the first and second clusters is a redundant array of independent nodes networked together, wherein each node executes an instance of an application that provides object-based storage of the content data and the metadata.

11. The method as described in claim 10 wherein the content data is fixed content data.

* * * * *